(12) United States Patent
Kunii

(10) Patent No.: US 8,090,915 B2
(45) Date of Patent: Jan. 3, 2012

(54) PACKET TRANSMISSION CONTROL APPARATUS AND METHOD

(75) Inventor: Jouji Kunii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 536 days.

(21) Appl. No.: 12/195,980

(22) Filed: Aug. 21, 2008

(65) Prior Publication Data

US 2008/0304505 A1   Dec. 11, 2008

Related U.S. Application Data

(63) Continuation of application No. PCT/JP2006/303496, filed on Feb. 24, 2006.

(51) Int. Cl.
*G06F 12/00* (2006.01)
*G06F 13/00* (2006.01)
*G06F 13/28* (2006.01)

(52) U.S. Cl. ........ 711/149; 711/147; 711/157; 709/253; 710/52; 710/21

(58) Field of Classification Search ................... 711/147, 711/149, 157; 709/253; 710/52, 21
See application file for complete search history.

(56) References Cited

U.S. PATENT DOCUMENTS

| | | | |
|---|---|---|---|
| 5,761,728 A | 6/1998 | Saito et al. | |
| 6,285,679 B1 | 9/2001 | Dally et al. | |
| 6,370,145 B1 | 4/2002 | Dally et al. | |
| 6,563,831 B1 | 5/2003 | Dally et al. | |
| 6,674,786 B1 | 1/2004 | Nakamura et al. | |
| 2003/0099238 A1 | 5/2003 | Payne et al. | |

FOREIGN PATENT DOCUMENTS

| | | | |
|---|---|---|---|
| JP | 5-89065 A | 4/1993 |
| JP | 6-131244 A | 5/1994 |
| JP | 8-77104 A | 3/1996 |
| JP | 8-95908 A | 4/1996 |
| JP | 9-62640 A | 3/1997 |
| JP | 2001-101128 A | 4/2001 |
| JP | 2001-175520 A | 6/2001 |
| JP | 2001-514463 | 9/2001 |
| JP | 2001-337861 | 12/2001 |
| JP | 2002-351818 A | 12/2002 |
| JP | 2002-366511 A | 12/2002 |
| JP | 2003-6173 A | 1/2003 |
| JP | 2003-132006 | 5/2003 |
| JP | 2003-316717 A | 11/2003 |
| JP | 2005-510798 A | 4/2005 |
| JP | 2005-275730 A | 10/2005 |
| WO | 99/11033 | 3/1999 |

OTHER PUBLICATIONS

International Search Report of PCT Application No. PCT/JP2006/303496 (mailed May 30, 2006). Japanese Notice of Rejection Grounds, Partial English-language translation, mailed Dec. 21, 2010 for corresponding Japanese Application No. 2008-501558.
Japanese Notice of Rejection Grounds, English-language Translation, mailed Mar. 29, 2011 for corresponding Japanese Application No. 2008-501558.

*Primary Examiner* — Stephen Elmore
*Assistant Examiner* — Mark Giardino, Jr.
(74) *Attorney, Agent, or Firm* — Fujitsu Patent Center

(57) ABSTRACT

A packet transmission control apparatus includes a plurality of controllers, an arbitrator, a BUSY control circuit, and a memory. The controller controls a transmission of a packet to an interface and manages a request for data to a memory and a reception of data from the memory. The arbitrator selects a controller to be used from among the plurality of controllers. The BUSY control circuit recognizes a BUSY state of a control unit at destination of a packet. The memory stores data to be requested.

6 Claims, 5 Drawing Sheets

PACKET TRANSMISSION CONTROL APPARATUS AND METHOD

CROSS REFERENCE TO THE RELATED APPLICATION

This is a continuation of PCT application PCT/JP2006/303496, which was filed on Feb. 24, 2006.

BACKGROUND OF THE INVENTION

1. Field of the Invention

The present invention relates to a packet transmission control apparatus for transmitting a packet read from a random access memory (RAM) equipped in a system controller to an interface on transmission side.

2. Description of the Related Art

FIG. 1 is an outline diagram showing the configuration of a conventional multi-computer system. In FIG. 1, the computer systems are respectively named the system-0 and system-1 computer systems, categorized by the numbers, "0" and "1", that are assigned to system controllers (SC) 10 and 20.

The configurations of the system-0 and system-1 computer systems are the same and therefore the configuration of the system-0 computer system is briefly described in the following. In the system-0 computer system, a first CPU 1 and a second CPU 2 are connected to a system controller SC0 (10), to which a plurality of DIMMs (dual inline memory modules) 4 and 6 are respectively connected by way of first and second media access controllers (MACs) 3 and 5. Further, the system-0 computer system and the system-1 computer system are interconnected by way of system controllers SC10 and SC20.

A random access memory (RAM) (not shown in a drawing herein) is provided in each of the system controllers SC10 and SC20, so that packets read out from the RAM are transmitted to a correspondent by way of an interface (not shown in the drawing herein).

FIG. 2 shows a conventional packet transmission control apparatus. The packet transmission control apparatus reads out a packet using one controller CNTL from a RAM provided in the system controller SC10, and transmits it to a correspondent node through an interface (not shown). As shown in FIG. 2, the conventional packet transmission control apparatus includes a controller unit (CNTL) 30, a BUSY control circuit 40, and a RAM (memory) 50. The controller unit 30 controls the transmission of a packet to an interface (IF) unit, and manages a data request to the RAM 50 and data reception from the RAM 50. The BUSY control circuit 40 recognizes the BUSY state of a control unit (not shown in the drawing herein) of a packet destination. The RAM 50 stores data to be requested.

The controller unit (CNTL) 30 shown in FIG. 2, equipped with a STM (state-machine) 31 (refer to reference patent document 1), controls the timing of a request to the RAM 50, receives data from the RAM 50, detects the data length and errors, and prepares a packet to be transmitted on the basis of the data stored in the RAM. The STM 31 shifts states by means of a control signal or predetermined timing, and manages the process carried out in the state. Note that the controller unit (CNTL) 30 includes latches 32 and 33 for exchanging data with the RAM 50.

Further, the BUSY control circuit 40 judges the packet processing state of an interface at the correspondent on the basis of a signal sent from the interface, and instructs the STM 31 to stop transmitting data if the BUSY control circuit 40 recognizes a BUSY state.

The RAM 50 stores data to be requested. When a readout request with a read address is given, the RAM 50 reads out the requested data according to the read address.

Next is a description of the operation of the conventional packet transmission control apparatus, using the time chart shown in FIG. 3. Referring to FIG. 3, when a data request is enabled, the STM 31 of the CNTL 30 is activated and the state is shifted from an IDLE (00) to an ST0. When the CNTL 30 sends a readout request (REQ to RAM) to the RAM 50, the STM 31 shifts from the ST0 to ST1 and waits for a request permission signal (VLD (valid) from RAM) from the RAM 50. When the request permission signal (VLD from RAM) is issued from the RAM 50, it prepares to read data, while the STM 31 of the CNTL 30 shifts from the ST1 to ST2 and prepares to receive data (READ DATA). The CNTL 30 receives the data (READ DATA) from the RAM 50 and transmits the DATA to the IF unit (output DATA to IF) in association with the STM 31 shifting from the ST2 to ST3. Upon completion of transmitting the data, the STM 31 ends the operation and returns to the initial state to repeat the request for data. If a BUSY occurs, the BUSY control circuit 40 sends a control signal to the STM 31 so as to stop transmitting data. When the control signal is cancelled, the STM 31 resumes its operation in order to transmit data.

The above described packet transmission control apparatus uses one controller to process requests and therefore there must be a wait until one process is completed before the next request is processed. In order to solve this problem, it is conceivable to design a timing control circuit for a RAM readout controller to control packets without time gap. The timing control circuit calculates a readout latency from RAM including waiting period for arbitration between readout requests to RAM, and the timing of completion of data transmission and restart of transmission by reflecting BUSY of interface of data destination side. There is a problem with such a design, however, in that it requires complex control mechanisms and thus a substantial number of difficulties need to be overcome to implement it.

Patent document 1: Laid-Open Japanese Patent Application Publication No. 2001-337861 (paragraph 4, line 15 through paragraph 7, line 2; and FIGS. 1 and 4)

SUMMARY OF THE INVENTION

One embodiment of a packet transmission control apparatus includes a plurality of controllers for controlling a transmission of a packet to an interface and managing a request for data to a memory and a reception of data from the memory; an arbitrator for selecting a controller to be used from among the plurality of controllers; a BUSY control circuit for recognizing a BUSY state of a control unit at destination of a packet; and a memory for storing data to be requested.

DESCRIPTION OF THE EMBODIMENTS

The following is a detail description the embodiment by referring to the accompanying drawings.

Figure 1:
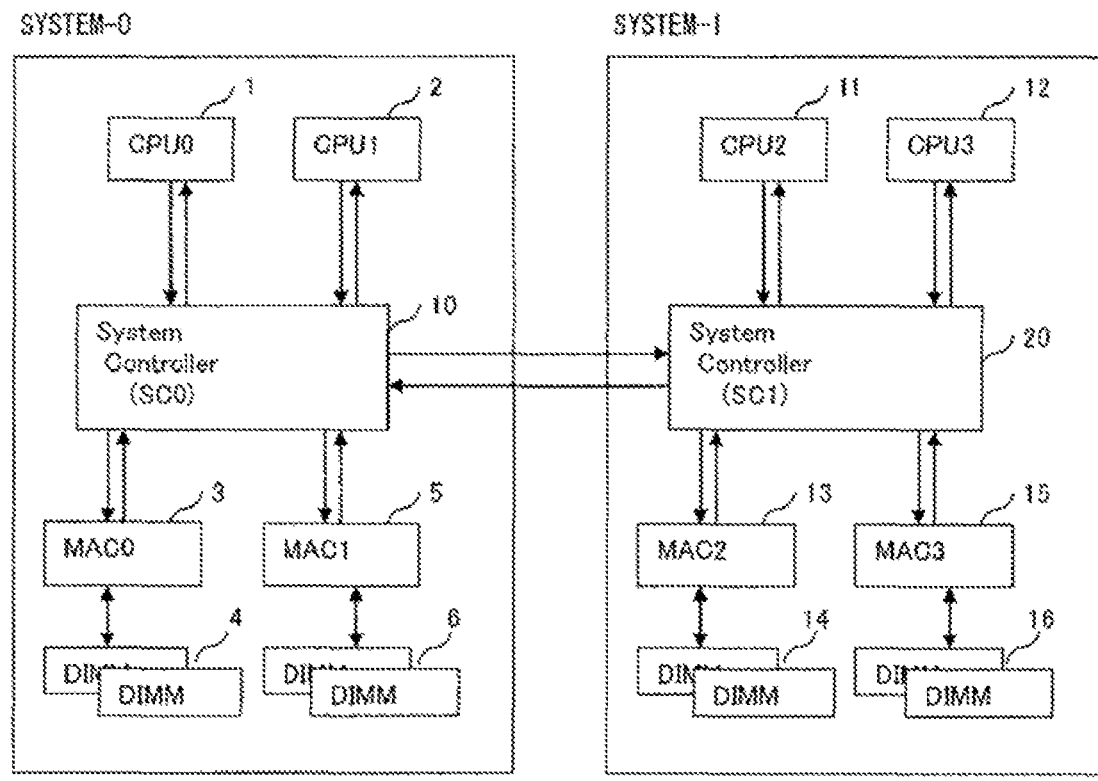
FIG. 1 is an outline diagram showing the configuration of a conventional multi-computer system.
Figure 2:
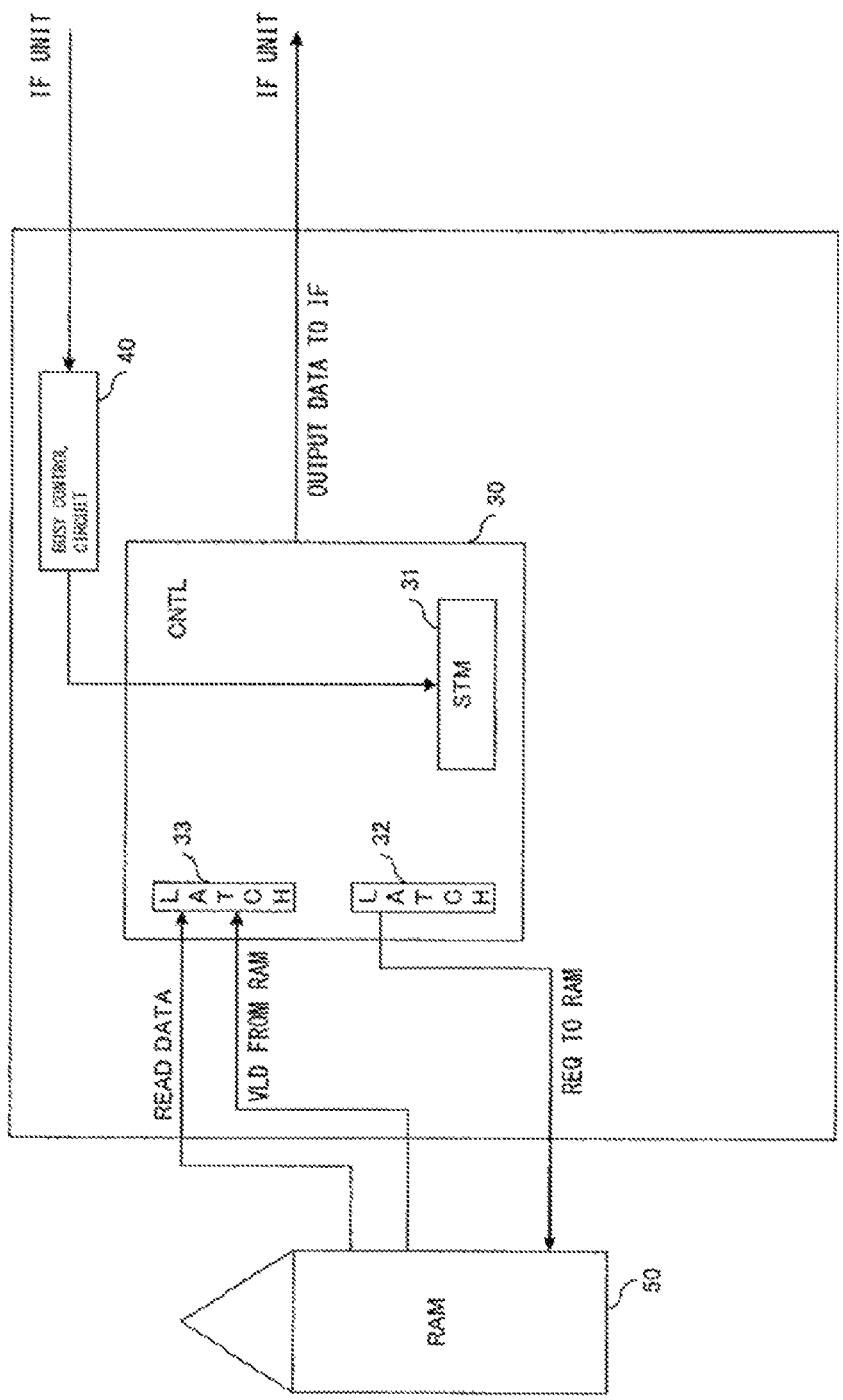
FIG. 2 is a diagram showing the configuration of a conventional packet transmission control apparatus.
Figure 3:
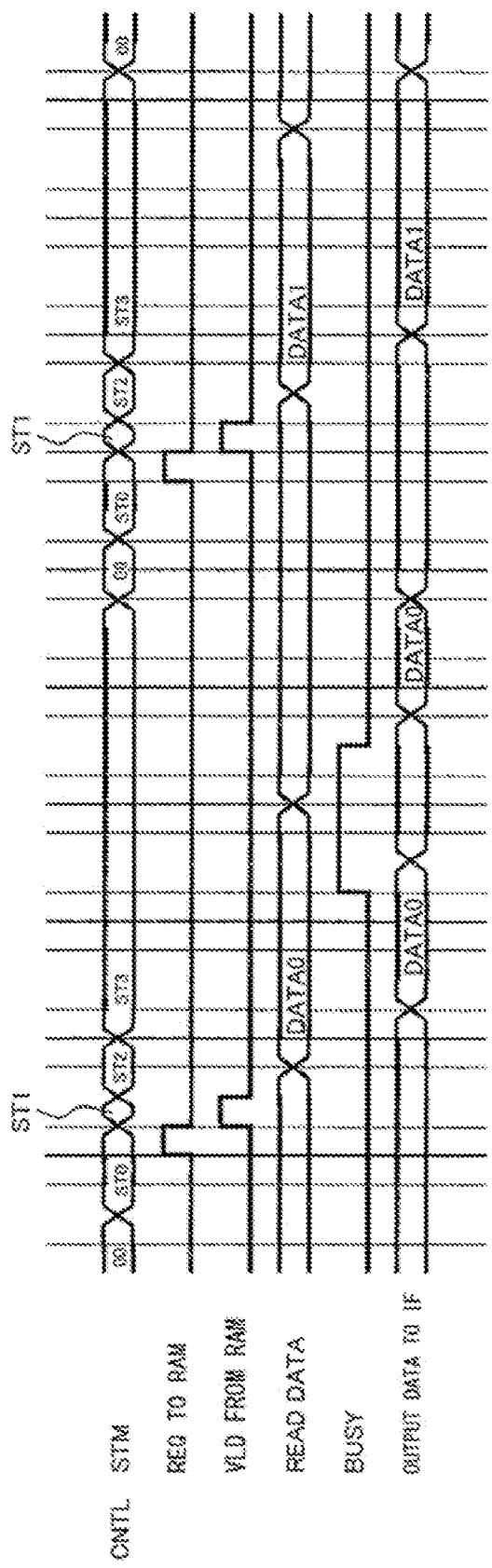
FIG. 3 is a time chart describing the operation of the conventional packet transmission control apparatus.
Figure 4:
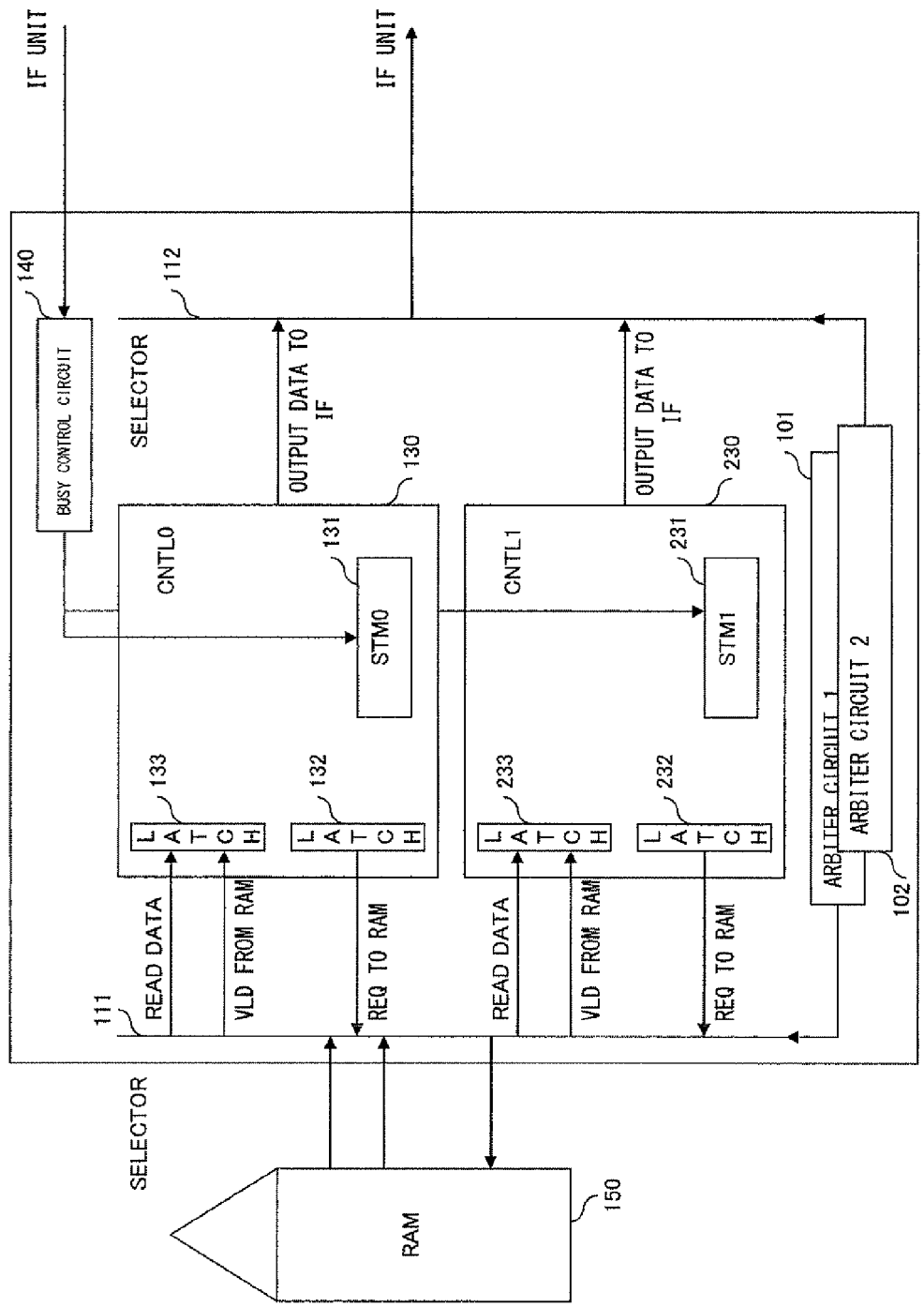
FIG. 4 is a diagram showing the configuration of a packet transmission control apparatus according to the embodiment.

FIG. 4 is a diagram showing the configuration of a packet transmission control apparatus according to an embodiment. Referring to FIG. 4, the packet transmission control apparatus according to the embodiment includes a plurality of controllers (CNTL0 and CNTL1) 130 and 230 for controlling the transmission of packets to an interface (IF) unit and managing a data request to a random access memory (RAM) and a data reception therefrom; a first arbitrator circuit 101 for selecting, from among the plurality of controllers, a controller to be used to request the RAM for data and receive data therefrom; a second arbiter circuit 102 for selecting a controller to be used to transmit a packet to the IF unit; a BUSY control circuit 140 for recognizing a BUSY state of a control unit (not shown in a drawing herein) at a destination of a packet; and a RAM (memory) 150 for storing data to be requested.

The packet transmission control apparatus according to the embodiment has a plurality of controllers that are relatively easy to control, and arbitrator (an arbitration circuit) for arbitrating between the plurality of controllers so as to operate the plurality of controllers alternately, thereby making it possible to fill the gaps caused by stopping the packet transmission to a destination and accordingly to operate the multiplexed controllers without taking into consideration a latency in reading a packet from the RAM.

The controllers (CNTL0 and CNTL1) 130 and 230 shown in FIG. 4, equipped with state machines (STMs) 131 and 231, respectively, control the timing of requests to the RAM 150, receive data from the RAM 150, detect the data length and whether there are errors, and prepare a packet to be transmitted on the basis of the data stored in the RAM 150. Further, the STMs 131 and 231 shift states by means of a control signal or predetermined timing, and manages the process carried out in the state. Note that the controllers (CNTL0 and CNTL1) 130 and 230 include latches 132 and 133, and latches 232 and 233, respectively, for exchanging data with the RAM 150.

The arbiter circuits 101 and 102, provided between the controllers 130 and 230 and the RAM 150, and between the controllers 130 and 230 and the interface, give a control signal to selectors 111 and 112 to select a controller for sending a request to the memory, for receiving data from the memory, or transmitting data to the interface. The first arbiter circuit 101 selects, by instructing the selector 111, a controller to be used and processes the signal of the selected controller with a priority, and the second arbiter circuit 102 selects, by instructing the selector 112, a controller to be used and processes the signal of the selected controller with a priority.

Further, the BUSY control circuit 140 judges the state of packet processing in the interface at the correspondent on the basis of a signal sent from the interface (IF) and, if a BUSY state is recognized, makes the STMs 131 and 231 to stop transmitting data. The BUSY control circuit 140 may be realized by, for example, an up-down counter, and counts up when transmitting packet data of a predetermined length to the control unit at the correspondent, counts down when processing packet data of a predetermined length transmitted from the control unit of the correspondent, and, if the count-up value reaches a predefined value, recognizes a BUSY state, that is, the packet processing is delayed in the control unit at the correspondent.

Further, the RAM (memory) 150 stores data to be requested. When a read out request with a read address is given, the RAM 150 reads out the requested data according to the read address.

Figure 5:
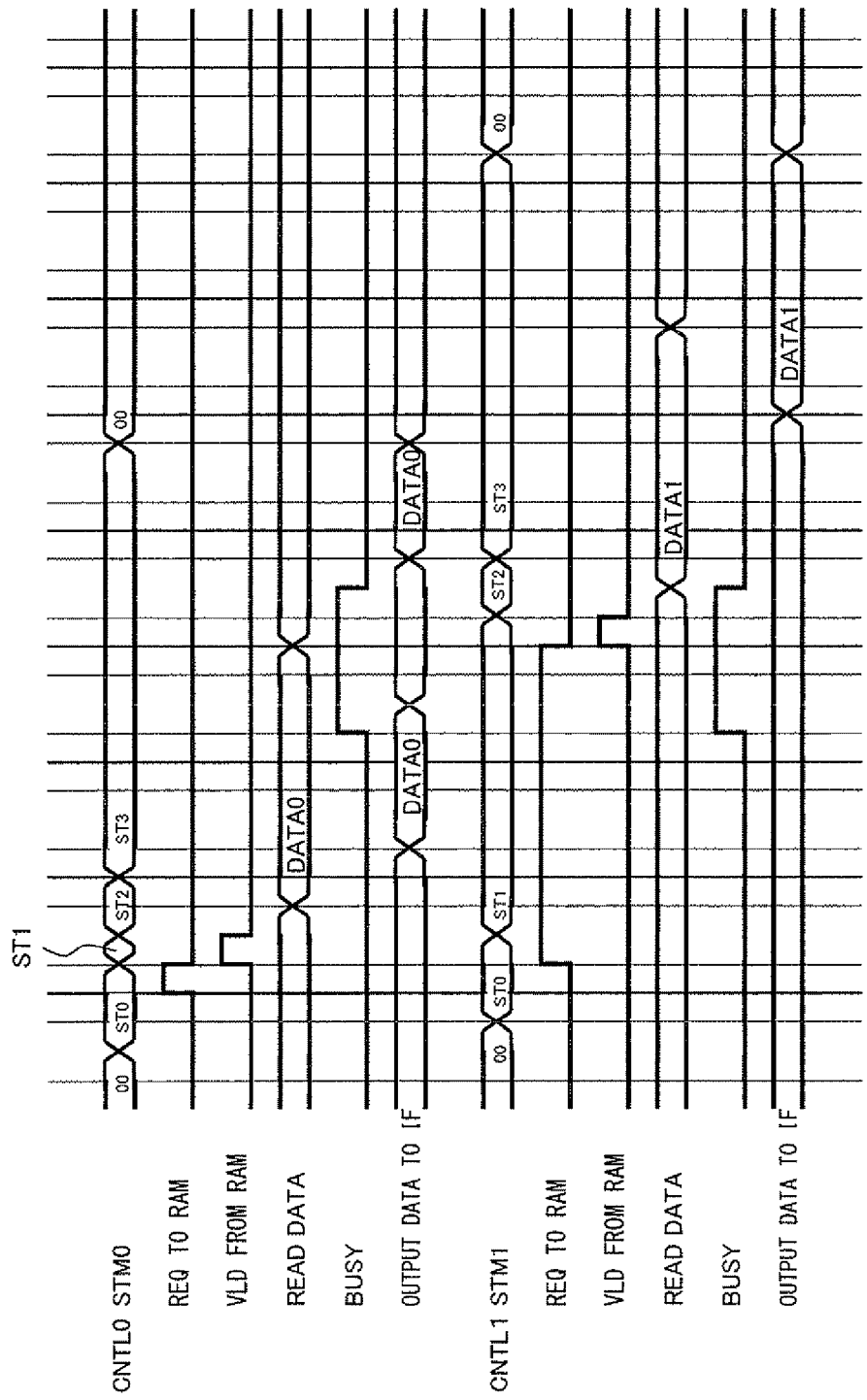
FIG. 5 is a time chart describing the operation of the packet transmission control apparatus according to the embodiment.

FIG. 5 is a time chart describing the operation of the packet transmission control apparatus according to the embodiment. To begin with, when the first controller CNTL0 (130) selected by the first arbiter circuit 101 shown in FIG. 4 starts the operation so as to be ready to request data, the STM0 (131) of the CNTL0 (130) is activated and the state is shifted from an IDLE (00) to ST0. When the first controller CNTL0 (130) sends a request to the RAM 150 to perform reading (CNTL0: REQ to RAM), the STM0 (131) shifts from the ST0 to ST1 and waits for a request permission signal (CNTL0: VLD (valid) from RAM) from the RAM 150. If the requests from a plurality of controllers conflict with one another, the first arbiter circuit 101 processes the request from the selected controller with a priority.

When the RAM 150 issues the request permission signal (CNTL0: VLD from RAM), the RAM 150 prepares to read data, while the STM0 (131) of the first controller CNTL0 (130) shifts from ST1 to ST2 so as to prepare to receive data (CNTL0: READ DATA). The first controller CNTL0 (130) receives the data (READ DATA) read from the RAM 150 and transmits the DATA to the IF unit (CNTL0: output DATA to IF) as the STM0 (131) shifts from the ST2 to the ST3.

The second controller CNTL1 (230) is enabled to start up the STM1 (231) of the CNTL1 (230) while the first controller CNTL0 (130) is in operation (CNTL1: STM1) and issue a request for a readout (CNTL1: REQ to RAM). During this time, the STM1 (231) of the CNTL1 (230) is retained in ST1 and waits for a request permission signal from the RAM 150 (CNTL1: VLD from RAM). If a request permission signal has been issued from the RAM 150 and if the first controller CNTL0 (130) has completed receiving data from the RAM 150, the second controller CNTL1 (230) is able to read data from the RAM 150 while the first controller CNTL0 (130) is transmitting data to the IF unit. Then, upon completion of the first controller CNTL0 (130) transmitting the data, the operation of the STM0 (131) of the first controller CNTL0 (130) also ends, enabling the STM1 (231) of the second controller CNTL1 (230) to transmit data.

Meanwhile, when a BUSY signal is issued from the BUSY control unit 140 (or the BUSY state is recognized) as shown in FIG. 5, the transmission of DATA to the IF unit (CNTL0: output DATA to IF) is interrupted. During this time, although another controller (the second controller CNTL 1 (230) in the example of FIG. 5) is enabled to operate, the DATA transmission to the IF unit (CNTL1: output DATA to IF) is performed after the first controller CNTL0 (130) selected by the second arbiter circuit 102 finishes the data output operation.

As described above, the packet transmission control apparatus includes a plurality of controllers and an arbitrator for arbitrating between the controllers. Each of the controllers is relatively easy to control though it may not transmit packets continuously. The gap between packets can be filled (or, the packets can be transmitted continuously) by making the controllers operate alternately. Each controller operates without being aware of the states of other controllers so that, when a first controller transmitting a packet to an interface cannot transmit the packet due to an inconvenience at an interface, a second controller is able to operate so as to enable the readout of the next data from the memory. In this case, since the second controller has already read the data, it is possible to process the packets continuously without requiring a complex control when restarting the transmission of a packet.

In addition, according to the packet transmission control apparatus of the embodiment, a complex control relating to conflict arbitration and a latency in the readout of RAM (memory) or the like, is not needed, when requesting for a readout.

Further, since a plurality of controllers are operated alternately, after issuing one request, next request can be issued when a conflict is arbitrated without considering latency in reading RAM (memory) including a waiting time for conflict arbitration.

Furthermore, when a packet transmission is stopped due to the BUSY state of an interface at the correspondent, another controller can issue a request for reading RAM.

Note that although the above description has been provided for the application to a system controller (SC), the present invention is applicable to other controllers such as a memory controller, in lieu of the application being limited as described above.

What is claimed is:

1. A packet transmission control apparatus connected to a data requestor via an interface, the packet transmission control apparatus comprising:
   a memory that stores data to be requested from the data requestor;
   a BUSY control circuit that receives a request for data from the data requestor via the interface, and recognizes a BUSY state of the data requestor;
   a plurality of controllers that control a received request for data from the BUSY control circuit, and a response of data from the memory to the data requestor based on the recognized BUSY state;
   a first selector that connects to the plurality of controllers and the memory;
   a second selector that connects to the plurality of controllers and the interface;
   a first arbitrator that instructs the first selector to select one of the plurality of controllers to transfer a received request for data from the BUSY control circuit to the memory, and to receive a response of data from the memory; and
   a second arbitrator that instructs the second selector to select one of the plurality of controllers to transfer a received response of data from the memory to the data requestor via the interface.

2. The packet transmission control apparatus according to claim 1, wherein
   the controller comprises a state-machine for shifting states according to a control signal or predetermined timing, and managing a process carried out in the state, wherein the state machine controls timing of a request to the memory, receives data, detects the data length and whether an error exists, and prepares a packet to be transmitted on the basis of the memory data.

3. The packet transmission control apparatus according to claim 1, wherein
   the BUSY control circuit judges a packet processing state of an interface at a correspondent on the basis of a signal sent from the interface and, if a BUSY state is recognized, prompts the controller to stop transmitting data.

4. The packet transmission control apparatus according to claim 3, wherein
   the BUSY control circuit is constituted by an up-down counter.

5. A packet transmission control method for a packet transmission control apparatus connected to a data requestor via an interface, and includes a memory that stores data to be requested from the data requestor and a plurality of controllers that control a received request for data from a BUSY control circuit and a response of data from the memory to the data requestor, the packet transmission control method comprising:
   receiving a request for data from the data requestor via the interface;
   recognizing a BUSY state of the data requestor;
   instructing the first selector that connects to the plurality of controllers and the memory to select one of the plurality of controllers;
   transferring a received request for data from the BUSY control circuit to the memory by the selected controller;
   receiving a response of data from the memory by the selected controller;
   instructing the second selector that connects to the plurality of controllers and the interface to select one of the plurality of controllers; and
   transferring a received response of data from the memory to the data requestor via the interface based on the recognized BUSY state.

6. The packet transmission control method according to claim 5, further comprising:
   starting, by a controller that was not selected, an operation while a controller that has been selected is in operation;
   issuing a request for reading by starting up a state machine of the controller that was not selected, the state machine shifting from the idle state to the first state to be in standby; and
   reading, by a controller that was not selected, data from the memory while the controller that has been selected transmits data to an interface when a request permission signal is issued from the memory and when the controller that has been selected has completed receiving data from the memory.

* * * * *